United States Patent
Kneer et al.

(10) Patent No.: US 11,975,473 B2
(45) Date of Patent: May 7, 2024

(54) METHOD OF MANUFACTURING A CONTAINER

(71) Applicant: Gaplast GmbH, Altenau (DE)

(72) Inventors: Roland Kneer, Farchant (DE); Stephan Kneer, Farchant (DE); Kasim Yilginc, Oberammergau (DE)

(73) Assignee: GAPLAST GMBH, Altenau (DE)

(*) Notice: Subject to any disclaimer, the term of this patent is extended or adjusted under 35 U.S.C. 154(b) by 0 days.

(21) Appl. No.: 17/845,005

(22) Filed: Jun. 21, 2022

(65) Prior Publication Data
US 2022/0410460 A1    Dec. 29, 2022

(30) Foreign Application Priority Data

Jun. 23, 2021    (DE) .................. 10 2021 116 277.7

(51) Int. Cl.
*B29C 49/04*    (2006.01)
*B65D 1/02*    (2006.01)
(Continued)

(52) U.S. Cl.
CPC .... *B29C 49/0412* (2022.05); *B29C 49/04116* (2022.05); *B65D 1/0215* (2013.01);
(Continued)

(58) Field of Classification Search
CPC .......... B29C 49/0412; B29C 49/04116; B29C 2793/0018; B65D 1/0215; B65D 83/0055;
(Continued)

(56) References Cited

U.S. PATENT DOCUMENTS 5,316,135 A * 5/1994 Kneer .................. B65D 1/0215
                                                        222/215
6,109,468 A * 8/2000 Kneer ................ B65D 83/0055
                                                        215/385
(Continued)

FOREIGN PATENT DOCUMENTS

DE        4139555 A1    3/1993
DE        19737964 C1   8/1998
(Continued)

OTHER PUBLICATIONS

EP Form 1503 03.82 dated Oct. 13, 2022 for European Patent Application No. EP22178835.

*Primary Examiner* — Christopher M Rodd
*Assistant Examiner* — Shibin Liang
(74) *Attorney, Agent, or Firm* — Greer, Burns & Crain, Ltd.

(57) ABSTRACT

The method for manufacturing a container having a substantially stiff outer container and a readily deformable inner bag of thermoplastic plastic materials which do not form a weld connection with one another, with a container opening and holes in the outer container, wherein the method includes forming holes in the wall of the outer container at diametrically opposed positions, which lie on the intersection line of a plane defined by the base seam and the longitudinal axis of the container with the container wall and that a pin-shaped tool forces the inner bag through the holes by a predetermined distance from the wall of the outer container and thereby detaches it from the wall, whereafter a pressure medium is introduced through the holes into the gap between the inner bag and the outer container, which detaches the inner bag from the wall of the outer container.

5 Claims, 1 Drawing Sheet

(51) Int. Cl.
*B65D 83/00* (2006.01)
*B29L 9/00* (2006.01)
*B29L 31/00* (2006.01)

(52) U.S. Cl.
CPC .. *B65D 83/0055* (2013.01); *B29C 2793/0018* (2013.01); *B29L 2009/001* (2013.01); *B29L 2031/7158* (2013.01)

(58) Field of Classification Search
CPC . B65D 1/0261; B65D 90/02; B29L 2009/001; B29L 2031/7158
See application file for complete search history.

(56) References Cited

U.S. PATENT DOCUMENTS

| | | | |
|---|---|---|---|
| 6,276,558 | B1 * | 8/2001 | Kneer .............. B26D 1/44 264/513 |
| 2009/0274788 | A1 * | 11/2009 | Kneer .............. B29C 49/22 425/149 |
| 2015/0266199 | A1 | 9/2015 | Hisao |

FOREIGN PATENT DOCUMENTS

| | | |
|---|---|---|
| DE | 19737964 C1 | 10/1998 |
| EP | 0567574 B1 | 2/1995 |
| EP | 0912420 B1 | 6/1997 |

* cited by examiner

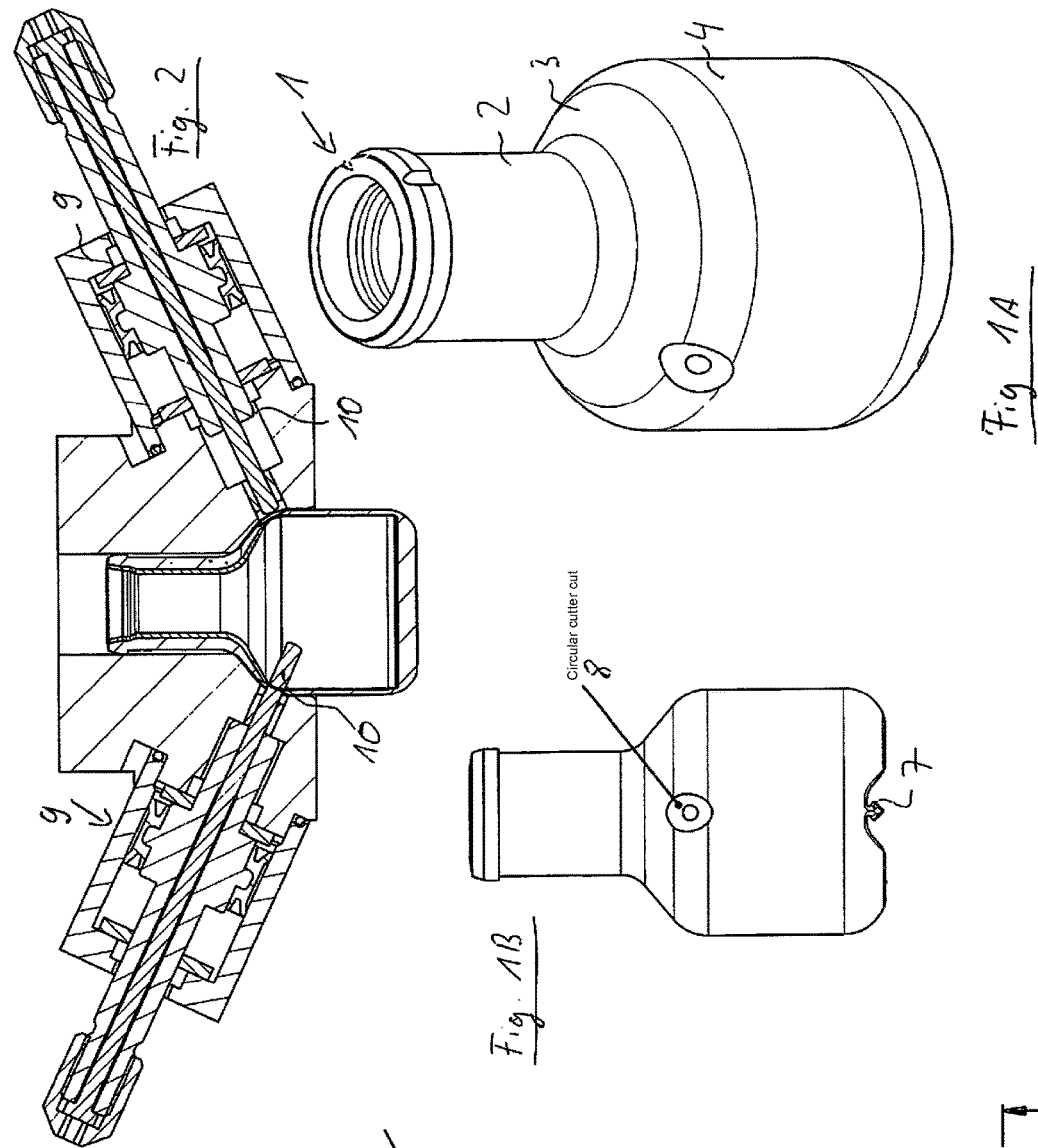
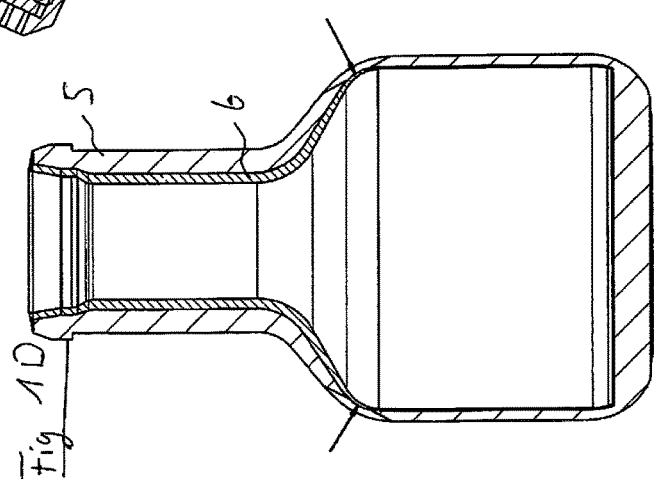

METHOD OF MANUFACTURING A CONTAINER

PRIORITY CLAIM

The subject application claims convention priority to German patent application No. DE 10 2021 116 277.7, filed Jun. 23, 2021.

FIELD OF THE INVENTION

The invention relates to a method of manufacturing a preferably bottle-shaped container, which has a substantially rigid outer container and a readily deformable inner bag, which are made of thermoplastic plastic materials, which do not form a weld connection with one another.

BACKGROUND

A method of manufacturing a preferably bottle-shaped container, which has a substantially rigid outer container and a readily deformable inner bag, which are made of thermoplastic plastic materials, which do not form a weld connection with one another, wherein the container has a container opening and at least two wall openings in the outer container, through which a pressure balance occurs in the gap between the inner bag and the outer container when the container contents are discharged, is known. The method of manufacturing the preform includes the step of at least two tubes are coextruded and are arranged between the open halves of a blow mould and the blow mould is closed when the preform has the length necessary for the manufacture of the container, wherein excess material in the base region of the container to be manufactured is squeezed out and a web is produced of welded material of the outer container, in which the welded base seam of the inner bag is clamped and is held in the axial direction and wherein the preform is inflated by a pressure medium into engagement with the wall of the blow mould and is removed from the blow mould, whereafter the wall openings are formed and the inner bag is detached from the wall of the outer container and again applied to it.

Such a method has been known for a long time. DE 4139555 C2 discloses a container manufactured in this manner, in which the wall openings are formed by the radially projecting material of the preform in the shoulder region of the bottle-shaped container being squeezed out on closure of the blow mould, whereby unwelded, open openings are produced at the shoulders.

In order that the inner bag can fold flat on discharge of the container contents, EP 0912420 B1 proposes to form the wall openings in the outer container offset through 90° to the plane, which is defined by the base seam and the longitudinal axis of the container. The container contents may thus be delivered with a reduced residual amount, whereby also a smaller sub-atmospheric pressure is produced in the inner bag.

In order to enable as complete as possible a discharge of the container contents by means of an airless pump or by exerting an external pressure in the case of a squeeze bottle, it has proved to be satisfactory, before the filling of the container, to detach the inner bag from the wall of the outer container, which is closely engaged by the inner bag with considerable adhesive forces. It has transpired that the detaching process, above all in the region of the shoulder of a container, can occur only erratically and incompletely so that a small residual amount of the container contents cannot be discharged. A more serious problem has, however, also arisen when the inner bag, principally in the region of the transition to the shoulder region, deforms irregularly and becomes partially folded during the detaching process, which, under certain circumstances, can result in white fracture of the bag material, with the consequence that, due to the damaged areas, the diffusion protection layer of the inner bag can be damaged or the bag can even become leaky.

The applicant has discovered that, when inflating the preform into engagement with the wall of the blow mould, the inner bag has a differing wall thickness in the peripheral direction, namely that the inner bag is thicker in the region of the vertical plane extending through the base seam than in the wall regions between them. An explanation for this can be that when squeezing out the base seam from a circular cylindrical initial shape, the preform is pressed flat, whereby the subsequent inflation produces a larger circular cylindrical shape with the greater wall thickness mentioned above in the region above the ends of the base seam.

This greater wall thickness in the aforementioned peripheral region of the inflated container can have the consequence, when detaching the inner bag by the introduction of compressed air into openings in the outer container, which are offset through 90° with respect to the thickened regions, that the inner bag is deformed non-uniformly during the detaching process, whereby fold-like distortions can form, particularly in the transition region to the shoulder section of the container, which, for their part, can lead to a white fracture of the inner bag, by which a damp diffusion layer of the inner bag can be damaged or the inner bag can even become leaky. Such a damaged container together with the contents of the container are unusable.

It is the object of the present invention to provide a method with which a serviceable container can be manufactured, in which the damage described above is avoided.

This object is solved in accordance with the invention by the features of claim 1.

Advantageous embodiments of the invention are characterised in the dependent claims.

SUMMARY OF THE INVENTION

The invention relates to a method of manufacturing a preferably bottle-shaped container, which includes a substantially rigid outer container and a readily deformable inner bag, which includes thermoplastic plastic materials, which do not form a weld connection with one another, wherein the container has a container opening and at least two wall openings in the outer container, through which a pressure balance occurs in the gap between the inner bag and the outer container when the container contents are discharged, wherein a preform including at least two tubes is coextruded and is arranged between the open halves of a blow mould and the blow mould is closed when the preform has the length necessary for the manufacture of the container, wherein excess material in the base region of the container to be manufactured is squeezed out and a web is produced of welded material of the outer container, in which the welded base seam of the inner bag is clamped and is held in the axial direction and wherein the preform is inflated by a pressure medium into engagement with the wall of the blow mould and is removed from the blow mould, whereafter the wall openings are formed and the inner bag is detached from the wall of the outer container and again applied to it.

The method of the invention provides that, when the container has been inflated, holes are formed in the wall of the outer container at diametrically opposed positions, which lie on the intersection line of a plane defined by the base seam and the longitudinal axis of the container with the container wall and that a pin-shaped tool forces the inner bag back through the holes through a predetermined distance from the wall of the outer container and thus releases it from the wall, whereafter a pressure medium, preferably compressed air, is introduced through the holes into the gap between the inner bag and the outer container, which substantially detaches the entire inner bag from the wall of the outer container.

The pressure medium can be blown in through the pin-shaped tool, if this is of hollow construction, or, for instance, through a pressure container, in which the container is disposed.

The holes can be formed at any desired height in the container in the aforementioned peripheral region. It is, however, proposed with particular advantages that the holes be formed in the shoulder region of the container, if this has a bottle shape, whereby the holes can also be formed closely beneath or above the shoulder region.

It is also proposed with particular advantages that the holes are formed by a circular cutter, which is described inter alia in DE 19737964 C1. It is, however, also within the scope of the invention that for example a rotating tubular cutter is used in order to produce the through holes in the outer container.

The inner bag may be released from the wall of the outer container over its entire periphery with the method in accordance with the invention, whereby damage of the inner bag or even its leakiness is avoided. Since the inner bag can be detached uniformly and completely from the wall of the outer container, it is also avoided that in the discharge of the container contents a significant residue of the container cannot be discharged, as is the case with an incomplete detaching process.

Further features of the invention will be apparent from the following description of a bottle-shaped container manufactured with the method in accordance with the invention. In the drawings:

BRIEF DESCRIPTION OF THE DRAWINGS

FIG. 1A shows a perspective view of a container having holes;

FIG. 1B shows a side elevation view of the container having holes;

FIG. 1C shows a top view of the container having holes;

FIG. 1D shows a vertical section view of the container along line A-A of FIG. 10;

FIG. 2 shows the container with a stamping pin for detaching the inner bag from the wall of the outer container.

DETAILED DESCRIPTION OF THE INVENTION

The container 1 illustrated in the figures includes a neck region 2, which merges via a shoulder region 3 into the broader region 4. The container 1 is a substantially stiff outer container 5 and a readily deformable inner bag 6.

Situated at the base of the container there is a straight weld seam 7, in which the inner bag 6 is held.

FIG. 1B shows a side view of the container 5 having a hole 8, which passes through the wall of the outer container 5 and is situated in the vertical plane, which extends through the welded base seam 7 and the central longitudinal axis of the container 1. FIGS. 10 and 1D show that two holes 8 are formed diametrically opposite to one another in the wall of the outer container 6 and that the two holes 8 are not offset in the peripheral direction with respect to this plane, as is the case in the prior art.

The two holes 8 are situated in the transition region of the broad portion 4 of the container 1 to its shoulder region 3.

It may also be seen in the figures that the holes 8 are not formed by a boring tool but by a circular cutter, as is preferred.

FIG. 2 shows a device 9 with a stamp pin 10, which presses the inner bag through a predetermined distance into the interior of the container 1 through the hole 8 in order to detach the inner bag 6 in the surrounding region from the wall of the outer container 5, whereafter the detaching process is continued either by the device 9 or another device by blowing in compressed air. FIG. 2 shows, in the right-hand portion, a device 9 with a retracted stamp pin 10.

The invention claimed is:

1. A method of manufacturing a container having of a substantially stiff outer container and a readily deformable inner bag of thermoplastic plastic materials which do not form a weld connection with one another, with a container opening and holes in the outer container, through which a pressure balance occurs in a gap between the inner bag and the outer container, wherein a preform including at least two tubes is coextruded and is arranged between open halves of a blow mold and the blow mold is closed when the preform has a length necessary for the manufacture of the container, wherein excess material in a base region of the container to be manufactured is squeezed out and a web is formed of welded material of the outer container, in which a welded base seam of the inner bag is clamped and is held in an axial direction and the preform is inflated by a pressure medium into engagement with a wall of the blow mold and is removed from the blow mold, wherein the method of manufacturing comprises forming the holes in a wall of the outer container, detaching the inner bag from the wall of the outer container, wherein the holes are formed in the wall of the outer container at diametrically opposed positions, and lie on a plane defined by the base seam that intersects a longitudinal axis of the container and that a pin-shaped tool forces the inner bag through the holes by a predetermined distance from the wall of the outer container and thereby detaches it from the wall, whereafter the pressure medium is introduced through the holes into the gap between the inner bag and the outer container, which detaches the inner bag from the wall of the outer container.

2. The method as claimed in claim 1, wherein the container has a bottle shape, wherein the holes are formed in a shoulder region of the container.

3. The method as claimed in claim 1, wherein the holes are formed by a circular cutter.

4. The method as claimed in claim 1, wherein the holes are formed by a rotating tubular knife.

5. The method as claimed in claim 1, wherein the pressure medium is compressed air that is introduced through the pin-shaped tool.

* * * * *